United States Patent [19]

Sanchez et al.

[11] Patent Number: 4,478,251

[45] Date of Patent: Oct. 23, 1984

[54] ORIFICE FITTING SEAL ASSEMBLY

[75] Inventors: Ruben Sanchez, Katy; R. M. McEver, Jr., Houston, both of Tex.

[73] Assignee: Daniel Industries, Inc., Houston, Tex.

[21] Appl. No.: 404,429

[22] Filed: Aug. 2, 1982

[51] Int. Cl.³ ............................................. F16L 55/10
[52] U.S. Cl. .................................... 138/44; 138/94.3; 251/210; 137/625.33
[58] Field of Search ...................... 138/44, 94.3, 94; 251/210; 137/625.33

[56] References Cited

U.S. PATENT DOCUMENTS

| | | | |
|---|---|---|---|
| 2,214,959 | 9/1940 | Hamer | 138/44 X |
| 2,687,748 | 8/1954 | Whalen | 138/44 |
| 3,126,917 | 3/1964 | Hodgemon et al. | 138/44 |
| 3,780,982 | 12/1973 | Kemp | 138/44 X |
| 3,817,287 | 6/1974 | Aitken | 138/44 X |

*Primary Examiner*—James E. Bryant, III
*Attorney, Agent, or Firm*—Gunn, Lee & Jackson

[57] ABSTRACT

An orifice fitting seal assembly is provided for use in an orifice fitting having a body structure defining a flow passage and opposed spaced sealing surfaces surrounding the flow passage. The improvement comprises a pair of internal seal rings of symmetrical configuration which cooperate to define a plate receptacle within which an apertured orifice plate is positioned. Each of the internal seal rings defines peripheral locking flanges that are disposed in spaced relation when the rings are in assembly. An external locking ring surrounds the assembled internal seal rings and establishes locking engagement therewith to retain the internal seal rings and the orifice plate in assembly. A pair of inner O-ring type sealing elements are retained within internal sealed grooves defined by each of the internal seal rings and the orifice plate. A pair of outer O-ring sealing elements are retained within outer modified dovetail grooves in each of the internal seal rings and serve to establish sealing engagement with the spaced sealing surfaces of the body structure. The orifice plate assembly is vented by vent passages from the back of the outer dovetail grooves to the exterior of the internal seal rings to enable relief of trapped gasses.

15 Claims, 2 Drawing Figures

ORIFICE FITTING SEAL ASSEMBLY

BACKGROUND OF THE INVENTION

1. Field of the Invention

This invention relates generally to orifice fitting mechanisms such as are placed in pipelines or other flow-way systems and which retain an orifice fitting in a flow passage to thus provide for controlled metering of the fluid flowing therethrough. More specifically, the present invention is directed to the provision of a cartridge type sealing unit for orifice fitting mechanisms which permits unitary installation and replacement of an orifice plate, together with an orifice plate sealing unit and the sealing elements establishing seals between the orifice plate and orifice plate sealing unit and between the orifice plate sealing unit and the body structure of the orifice fitting.

2. Description of the Prior Art

Orifice fittings have been manufactured and utilized for a number of years in connection with measurement of flowing fluid in pipelines and other fluid flow systems. As examples of conventional orifice fittings, reference may be had to U.S. Pat. Nos. 1,965,826; 1,996,192; and 2,688,987 of Daniel Industries, Inc., the present assignee hereof. In each of these patents, an orifice fitting is provided having a removable internal orifice plate sealing unit that supports an orifice plate in the flow passage of the orifice fitting. A mechanism is provided for transporting the orifice plate sealing unit from its operative position in the flow passage to a retracted position where the orifice plate sealing unit and orifice plate is removed from the flow passage of the valve and transported into an isolatable housing receptacle. The orifice fitting mechanism incorporates an intermediate valve mechanism having the capability of establishing an isolating seal between the body structure of the orifice fitting and the isolatable housing thereof. After the orifice plate carrier has been transported into the isolatable housing receptacle and the valve mechanism closed, the receptacle or chamber then may be vented without shutting down the fluid flow system. The orifice plate then may be removed from its sealing unit and replaced after which the sealing unit may again be transported into the flow passage for further measuring activity.

The orifice fitting mechanisms set forth in the above patents are of the more complex design which allow changing of the orifice plates without shutting down the fluid flow system. In other cases, orifice plate mechanisms are of more simple nature and simply incorporate an orifice plate body structure having a closure bonnet which is removable for replacement of an orifice plate sealing unit and the orifice plate in assembly therewith. In such simple orifice fitting mechanisms, it is necessary to depressurize the fluid flow system before the orifice plate bonnet is removed. Depending upon the circumstances involved, both types of orifice fitting mechanisms are in wide use at the present time.

Orifice fitting mechanisms are typically utilized to measure the flow of petroleum-based vapor. In many cases, the petroleum product involved is of severely corrosive and errosive nature, thereby requiring orifice plates to be replaced quite frequently in order to maintain optimum accuracy of flow measurement. In many cases, the orifice plate sealing unit can become severely corroded during use and must be replaced. Replacement of orifice plate sealing units can become a significantly time consuming and expensive operation when the flow system is subject to major down time thereby involving significant production losses. It is desirable therefore to provide an orifice plate mechanism that permits rapid changeout of the orifice plate sealing unit by means of simple and efficient, low cost servicing procedures.

In orifice fitting, as well as many other flow controlling products for petroleum-based fluids, elastomeric sealing elements are utilized to maintain effective seals between metal parts. Although elastomeric seals may take many other suitable configurations, it is typical to employ O-rings where desirable because of the low cost nature and effective sealing capability thereof. When orifice fittings are maintained under high pressure service, however, the elastomeric material from which O-rings and other such sealing elements are composed typically absorbs a significant quantity of highly compressed gas. When it is desired to remove the orifice plate from the orifice fitting mechanism, regardless of the type of orifice fitting, it is necessary to depressurize a fluid chamber in order to gain access to the orifice plate sealing unit for servicing operations. When the environment about the sealing elements is depressurized, the absorbed pressurized gas within the sealing members tends to cause the sealing member to swell. In many cases, depending upon the volume and nature of the elastomer, the sealing members can swell so rapidly that in a period of a very few minutes the orifice plate sealing unit can become tightly seized or locked in place by the expanded sealing members. After an orifice plate mechanism has become seized by gas expanded sealing elements, it becomes extremely difficult to accomplish removal of the orifice plate carrier mechanism. At times, the sealing elements themselves must be cut away in order to accomplish the repair operation. This is a time consuming and expensive procedure that frequently causes severe losses of production due to excessive down time for repair operations. It is therefore highly desirable that the orifice plate sealing unit contain a minimal amount of elastomer to minimize the degree of swelling and prevent such seizing of the orifice plate sealing unit, thus allowing for the complete removal of the orifice plate carrier mechanism as rapidly as possible.

It is desirable to provide an orifice fitting mechanism which has the capability of being simply and efficiently serviced by field technicians without requiring the provision of any special tools other than those necessary for gaining access to the orifice plate carrier assembly.

SUMMARY OF THE INVENTION

It is therefore a primary feature of the present invention to provide a novel seal assembly for orifice plate mechanisms having the capability of being installed or removed as a unit to thereby permit rapid installation and removal operations by service technicians.

It is also a feature of this invention to provide a novel seal assembly for orifice fittings which is capable of being installed and removed from an orifice plate carrier in unitary manner without requiring the use of any special tools by service technicians.

It is an even further feature of this invention to provide a novel seal assembly for orifice fitting mechanisms wherein all the parts thereof are retained in unitary assembly during shipment and handling and thereby providing field service personnel with efficiency of parts management and handling during field service operations.

Among the several features of this invention is the provision of a novel seal assembly for orifice fittings which is a unitary structure and which is vented upon depressurization of the surrounding environment such that any pressure contained therein does not cause the seal assembly to be tightly wedged in place and to prevent the sealing elements from being forced from their respective seal grooves by pressure that might otherwise be trapped internally of the seal assembly.

It is also an important feature of the present invention to provide a novel seal assembly for orifice fitting mechanisms which may be completely disassembled by field technicians and other service personnel such as for efficient replacement of the elastomeric sealing elements thereof under circumstances where only the sealing elements require replacement.

It is also a feature of this invention to provide a novel seal assembly for orifice fittings which may be inserted into an orifice fitting mechanism without regard to the direction of fluid flow because of the sealing capability thereof in either direction of flow.

It is an even further feature of this invention to provide a seal assembly for orifice fitting mechanisms which is of simple nature, is reliable in use and low in cost.

Briefly, a seal assembly for orifice fitting mechanisms, according to the present invention, incorporates a pair of symmetrical internal seal rings which are each formed to define internal and external annular seal grooves. The seal grooves at the outer portions of the internal seal rings are formed such that O-ring type sealing members are capable of being readily forced into the modified dovetail groove by manual force and, once in place, are maintained securely in place as a part of the unitary seal assembly. A pair of inner sealing elements are retained within the inner seal grooves and function to establish seals between the internal seal rings and the orifice plate contained within an orifice plate receptacle co-operatively defined by the internal seal rings. To retain the internal seal rings in unitary assembly, each of the internal seal rings is formed to define an annular locking ridge about the outer periphery thereof, the ridges forming spaced annular locking shoulders. A locking ring is capable of being placed about the annular locking ridges of the assembled internal seal rings and defines spaced internal annular flanges that establish locking engagement with the annular shoulders of the locking ridges. The spacing of the internal annular flanges of the locking ring is such that the internal seal rings are positioned in close relation and maintain the inner seal rings under sufficient mechanical compression to maintain positive seals with both the internal seal rings and the orifice plate without influence of fluid pressure. The outer annular sealing elements are slightly compressed when the seal assembly is placed between the spaced sealing surfaces of the orifice fitting to thereby establish positive interference sealing between the sealing assembly and the body structure of the orifice fitting about the flow passage thereof.

To prevent the seal rings from being forced from their respective grooves and to provide for pressure relief of the seal assembly to permit easy removal thereof for servicing, both of the internal seal rings are formed to define at least one vent passage to the exterior of the seal assembly. This feature is especially beneficial during removal of the seal assembly for repair or replacement thereof by service technicians.

BRIEF DESCRIPTION OF THE DRAWINGS

So that the manner in which the above recited features, advantages and objects of the present invention are attained and can be understood in detail, more particular description of the invention briefly summarized above may be had by reference to the embodiment thereof which is illustrated in the appended drawings.

It is to be noted, however, that the appended drawings illustrate only a typical embodiment of this invention and are therefore not to be considered limiting of its scope, for the invention may admit to other equally effective embodiments.

In the Drawings:

FIG. 1 is a partial section view of an orifice fitting body structure having a seal assembly constructed in accordance with the present invention being supported by an orifice plate carrier.

FIG. 2 is a fragmentary sectional view of the seal assembly structure of FIG. 1, further showing the structural details of the unitary orifice plate seal assembly.

DETAILED DESCRIPTION OF THE PREFERRED EMBODIMENT

Figure 1:
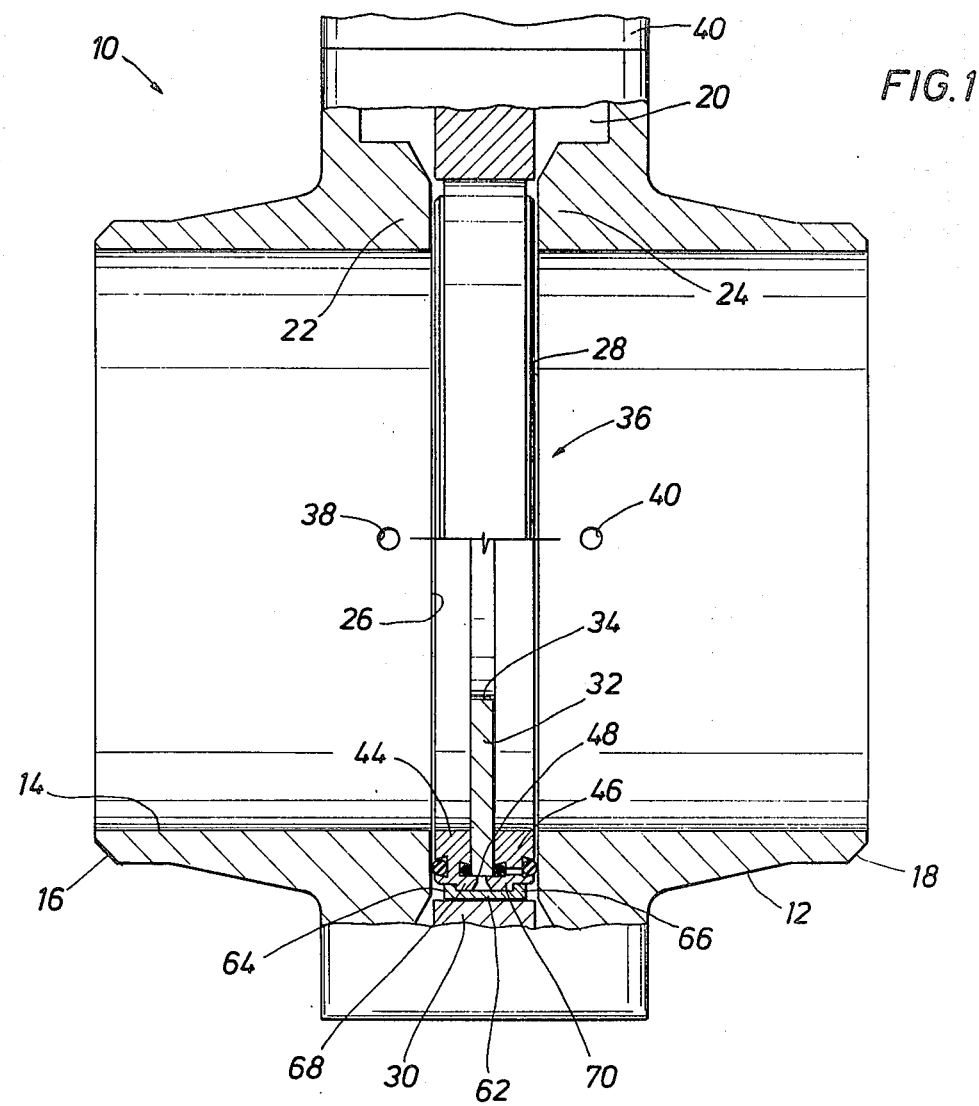

Referring now to the drawings, and first to FIG. 1, an orifice fitting mechanism is illustrated generally at 10 which includes a body portion 12 that is formed to define a flow passage 14 through which fluid flows. The body structure 12 is also formed to define connection means 16 and 18 to enable the body structure to be assembled in a suitable flow system such as a pipeline. As shown, the connection means 16 and 18 are in the form of weld preparations thus enabling the body structure to be welded to the piping of a fluid handling system. In the alternative, the connection means 16 and 18 may take the form of any other suitable connection structure such as bolt flanges, threaded connections, etc., without departing from the spirit and scope of this invention.

Within the body structure 12 is defined and internal chamber 20 within which extend opposed seat flanges 22 and 24 each having planar sealing surfaces 26 and 28 formed respectively thereon. The sealing surfaces 26 and 28 are disposed in parallel spaced relation.

An orifice plate carrier 30 is adapted to be positioned between the sealing surfaces 26 and 28 forming a continuous conduit and providing support and alignment for an orifice plate 32 having an aperture 34 formed therein. The orifice plate carrier may be movable within the orifice fitting structure between operative and retracted positions as disclosed in assignee's above-noted patents or, in the alternative, may be positioned immovable within the orifice fitting body structure. The orifice fitting carrier provides support for an orifice fitting assembly illustrated generally at 36 and discussed in detail in connection with FIGS. 1 and 2.

The orifice fitting body structure 18 is also formed to define pressure detection passage means terminating at openings 38 and 40 thus allowing pressure to be detected both upstream and downstream of the orifice plate aperture. As the pressurized fluid medium flows through the aperture 34 of the orifice plate a pressure differential will be established. This detected pressure differential is typically electronically processed in accordance with an accepted formula including the pressure and temperature of the flowing medium, the physical porperties of the flowing medium and certain constants in order to determine the volume of the flowing medium passing through the flow system. Orifice fittings of this nature are widely accepted because of their accuracy in the measurement of flowing fluids such as natural gas and other gaseous, semi-gaseous and liquid materials.

The upper portion of the orifice fitting structure may be constructed in accordance with the teachings of U.S. Pat. No. 2,688,987 of the assignee hereof, or in the alternative, may take any other suitable form without departing from the spirit and scope of this invention. For the purpose of simplicity, the internal structural and operational components of the upper portion of the orifice fitting mechanism is not illustrated in detail since it is not limiting in respect to the present invention.

Referring now to the lower portion of FIG. 1, the orifice fitting seal assembly 36 is shown in detail in the partial sectional view. The orifice plate assembly incorporates a pair of internal seal rings 44 and 46 which may be of substantially identical nature if desired. The internal seal rings cooperate in assembly to define a circular orifice plate receptacle 48 within which the orifice plate 32 is received, aligned, and encapsulated. As is evident from the more enlarged fragmentary sectional view of FIG. 2, each of the plate receptacle rings is formed to define an inner annular seal groove 50 within which is retained an inner seal member 52 which may conveniently take the form of an elastomeric O-ring or any other suitable sealing member. The inner sealing elements 52 are maintained in mechanical compresson in a manner described hereinbelow to thus provide interference sealing contact with the respective planar surface of the orifice plate 32 and the structure of the respective internal seal ring 44 and 46. Thus, both of the internal seal rings are maintained in sealed engagement with respect to the orifice plate 32 by means of the inner sealing elements 52 even under circumstances where the orifice fitting mechanism is unpressurized.

Figure 2:
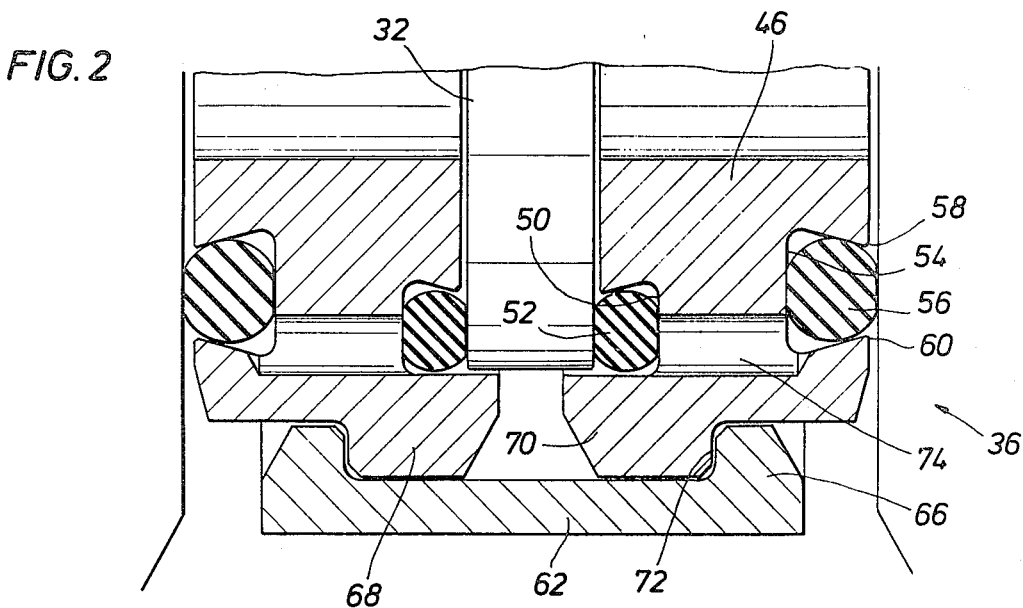

Each of the internal seal rings 44 and 46 is also formed to define an external seal groove such as shown at 54 in FIG. 2 within which is retained an outer sealing element 56 which also may conveniently take the form of an elastomeric O-ring or any other suitable sealing element.

Since it is desirable to provide the orifice fitting seal assembly 36 with a unitary capability such that all various parts thereof are retained in unitary assembly for shipment, handling, installation and removal, it is desirable that the outer sealing elements 56 be mechanically retained in assembly with the respective internal seal ring. For this reason, the annular seal groove 54 is formed of generally triangular configuration forming opposed seal retainer lips 58 and 60 that cooperate to define a seal opening of less width than the cross-sectional diameter of the sealing element 56. When the sealing element 56 is in place within the outer seal groove 54 an annular portion of it will protrude through the opening established by lips 58 and 60. This annular protruding portion is of such dimension as to establish effective sealing contact with respective ones of the sealing surfaces 26 and 28 of the orifice fitting body. The dimension of the opening of the seal groove is such, with respect to the cross-sectional diameter of the sealing element, that the sealing element can be manually forced into the respective seal groove by service technicians. After the sealing element has been so positioned within the seal groove the opposed lips 58 and 60 function to retain the sealing element in mechanical assembly with the metal internal seal ring. Service personnel need not be concerned with missing or replaced parts since the orifice fitting seal assembly can be handled in unitary manner with the sealing elements thereof. Further, during installation of the orifice fitting seal assembly within the carrier 30, service personnel need not be concerned with the possibility that the parts might become partly disassembled during installation. The orifice fitting seal assembly is simply inserted in place within the carrier as a unit and is removed in like manner. Installation and removal is therefore accomplished within a minimum period of service time, thus facilitating efficient production.

It is desirable that the internal seal rings 44 and 46 be maintained in assembly and it is also desired that the inner sealing elements 52 be maintained under mechanical compression to establish initial interference sealing with the orifice plate and the respective internal seal ring. In accordance with the present invention, these features are accomplished through the provision of external locking means which may conveniently take the form of an annular locking ring 62 in the form of a retainer band. The locking ring 62 is formed to define a pair of spaced inwardly directed locking flanges 64 and 66. The internal seal rings 44 and 46 define circular outer peripheral locking ridges 68 and 70 about which the locking ring 62 is received. These locking ridges define annular shoulder surfaces that are engaged by annular opposed spaced stop shoulder surfaces 72 to retain the internal seal rings in assembly. The annular locking ring 62 is formed of metal such as steel, and is sufficiently thin and flexible that it may be manually positioned about the locking ridges 68 and 70 by simple manual operations and without necessitating the use of any tools. The locking ring also may be removed by means of simple manual operations. This feature provides technicians with the capability of completely disassembling the seal assembly of the orifice fitting such as for replacement of the seal rings or inspection of the internal parts. The assembly and disassembly procedure can be accomplished manually without the use of tools. Also, the orifice plate 32 is removed in like manner. The locking flanges 64 and 66 establish retaining engagement with the respective locking ridges 68 and 70 to thereby retain the internal seal rings 44 and 46 in assembly. The spacing defined by the inner stop shoulder surfaces 72 and that of the locking flanges 64 and 66 is such that the inner sealing elements 52 are mechanically compressed such as shown in FIG. 3 to thus establish mechanical interference sealing engagement with the orifice plate 32 and the internal seal ring 46.

Under certain circumstances it may be possible for fluid pressure to become trapped within the orifice fitting seal assembly 36. If this should occur, reduction of the pressure externally of the orifice fitting seal assembly might cause the outer sealing elements 56 to be at least partially displaced from their respective seal grooves. Under such conditions, shifting of the seal assembly 36 to the operative or retracted positions thereof may cause the outer sealing elements 56 to be damaged by scraping or shearing contact with other structural elements of the orifice fitting mechanism. It is desirable therefore to provide the seal assembly 36 of the orifice fitting with a self-venting capability. In accordance with the present invention, this feature is achieved by forming both of the internal seal rings 44 and 46 to define a pressure relief passage 74 leading to the exterior of sealing unit. In the event the inner portion of the seal assembly should be pressurized and pressure external of the seal assembly is diminished such as during removal of the seal assembly from the orifice fitting for orifice plate inspection or replacement, the internal pressure of the seal assembly will simply be vented through the relief passage 74. Thus, there is no tendency for the sealing elements to be forced from their respective grooves by trapped pressure either during use of the orifice mechanism or during service operations therefor.

In view of the foregoing, it is evident that the present invention is one well adapted to attain all of the objects and features hereinabove set forth, together with other objects and features that are inherent from the apparatus described hereinabove.

What is claimed is:

1. In an orifice fitting mechanism for use in controlled metering of fluids and having a body structure defining a flow passage and opposed spaced sealing surfaces surrounding said flow passages, forming a continuous conduit and supporting an apertured orifice plate in the flow passage, the improvement comprising:
   (a) a pair of internal seal rings cooperating to define a plate receptacle within which said orifice plate is positioned, said internal seal rings each defining peripheral locking means;
   (b) external locking means surrounding said internal seal rings and retaining said internal seal rings in assembly;
   (c) first seal means for establishing sealed relation between said internal seal rings and said orifice plate;
   (d) second seal means for establishing sealed relation between said internal seal rings and said sealing surfaces of said body structure; and
   (e) each of said internal seal rings being formed to define pressure relief passage means extending from said plate receptacle to an outer portion of said internal seal rings.

2. The improvement of claim 1, wherein:
   (a) said internal seal rings each define annular inner seal grooves; and
   (b) said first seal means being a pair of annular sealing elements being removable received within respective ones of said inner seal grooves, said annular sealing elements protruding from said inner seal grooves for annular sealing engagement with said orifice plate.

3. The improvement of claim 1, wherein:
   (a) said internal seal rings each define annular outer seal grooves; and
   (b) said second seal means is a pair of annular outer sealing elements mechanically retained in respective ones of said outer seal grooves, annular portions of said annular outer sealing elements protruding from said outer seal grooves for sealing engagement with respective ones of said spaced sealing surfaces of said body structure.

4. The improvement of claim 1, wherein:
   (a) said internal seal rings each define inner and outer annular seal grooves; and
   (b) sealing elements are retained within said seal grooves.

5. The improvement of claim 1, wherein:
   (a) said second seal means comprise a pair of O-ring sealing elements composed of sealing material; and
   (b) said internal seal rings each define an outer annular seal groove having a cross-sectional configuration establishing mechanical interlocking relation with said O-ring sealing elements.

6. The improvement of claim 5, wherein:
said second seal grooves are of generally triangular cross-sectional configuration defining an annular groove opening of less width than the cross-sectional diameter of said O-ring sealing elements and of sufficient width to permit manually forced insertion of said O-ring sealing elements into respective ones of said second seal grooves.

7. The improvement of claim 6, wherein;
   (a) said seal means comprise a pair of O-ring sealing elements; and
   (b) said internal seal rings each define an internal annular seal groove containing said first O-ring sealing elements, annular portions of said first O-ring sealing elements protruding from said internal annular seal grooves for annular sealing engagement with said orifice plate.

8. The improvement of claim 1, wherein:
said external locking means retains said internal seal rings in forcible assembly such that said first seal means is maintained under mechanical sealing compression with said internal seal rings and said orifice plate.

9. The improvement of claim 1, wherein:
   (a) annular outer peripheral locking ridge means is defined by each of said internal seal rings, said locking ridge means of assembled internal seal rings being disposed in spaced relation; and
   (b) said external locking means being an annular locking ring defining a pair of spaced internal annular locking flanges, said annular locking flanges being positioned in retaining engagement with said locking ridge means of said internal seal rings to thus retain said internal seal rings and said first seal means in assembly.

10. In an orifice fitting mechanism for use in controlled metering of fluids and having a body structure defining a flow passage and opposed spaced sealing surfaces surrounding said flow passages, forming a continuous conduit and supporting an apertured orifice plate in the flow passage, the improvement comprising:
   (a) a pair of internal seal rings cooperating to define a plate receptacle within which said orifice plate is positioned, said internal seal rings each defining locking means;
   (b) locking means retaining said internal seal rings in releasable assembly;
   (c) first seal means positioned for sealing relation between said internal seal rings and said orifice plate;
   (d) second seal means establishing sealed relation between said internal seal rings and said sealing surfaces of said body structure; and
   (e) each of said internal seal rings being formed to define pressure relief passage means extending from said plate receptacle to an outer portion of said internal seal rings.

11. The improvement of claim 10, wherein:
   (a) said internal seal rings are composed of rigid material and each form circular seal grooves on opposite sides thereof; and
   (b) said pressure relief passage means of each of said seal rings interconnecting said seal grooves thereof.

12. The improvement of claim 10, wherein:

said locking means retains said internal seal rings in forcible assembly such that said first seal means is maintained under mechanical sealing compression with said internal seal rings and said orifice plate.

13. The improvement of claim 10, wherein said locking means includes:
(a) annular outer peripheral locking ridge means defined by each of said internal seal rings, said locking ridge means of assembled internal seal rings being disposed in spaced relation; and
(b) an annular locking ring defining a pair of spaced internal annular locking flanges, said annular locking flanges being positioned in retaining engagement with said locking ridge means of said internal seal rings and retaining said internal seal rings and said first seal means in releasable assembly.

14. The improvement of claim 10, wherein said second seal means includes:
(a) a pair of O-ring sealing elements composed of sealing material; and
(b) said internal seal rings each defining an outer annular seal groove having a cross-sectional configuration establishing structurally retaining relation with said pair of O-ring sealing elements.

15. The improvement of claim 12, wherein said second seal means comprises:
(a) a pair of O-ring sealing elements; and
(b) second seal grooves formed in said internal seal rings and being of generally triangular cross-sectional configuration and defining annular groove opening of less width than the cross-sectional diameter of said O-ring sealing elements and of sufficient width to permit manually forced insertion of said O-ring sealing elements into respective ones of said second seal grooves.

* * * * *